2,826,184

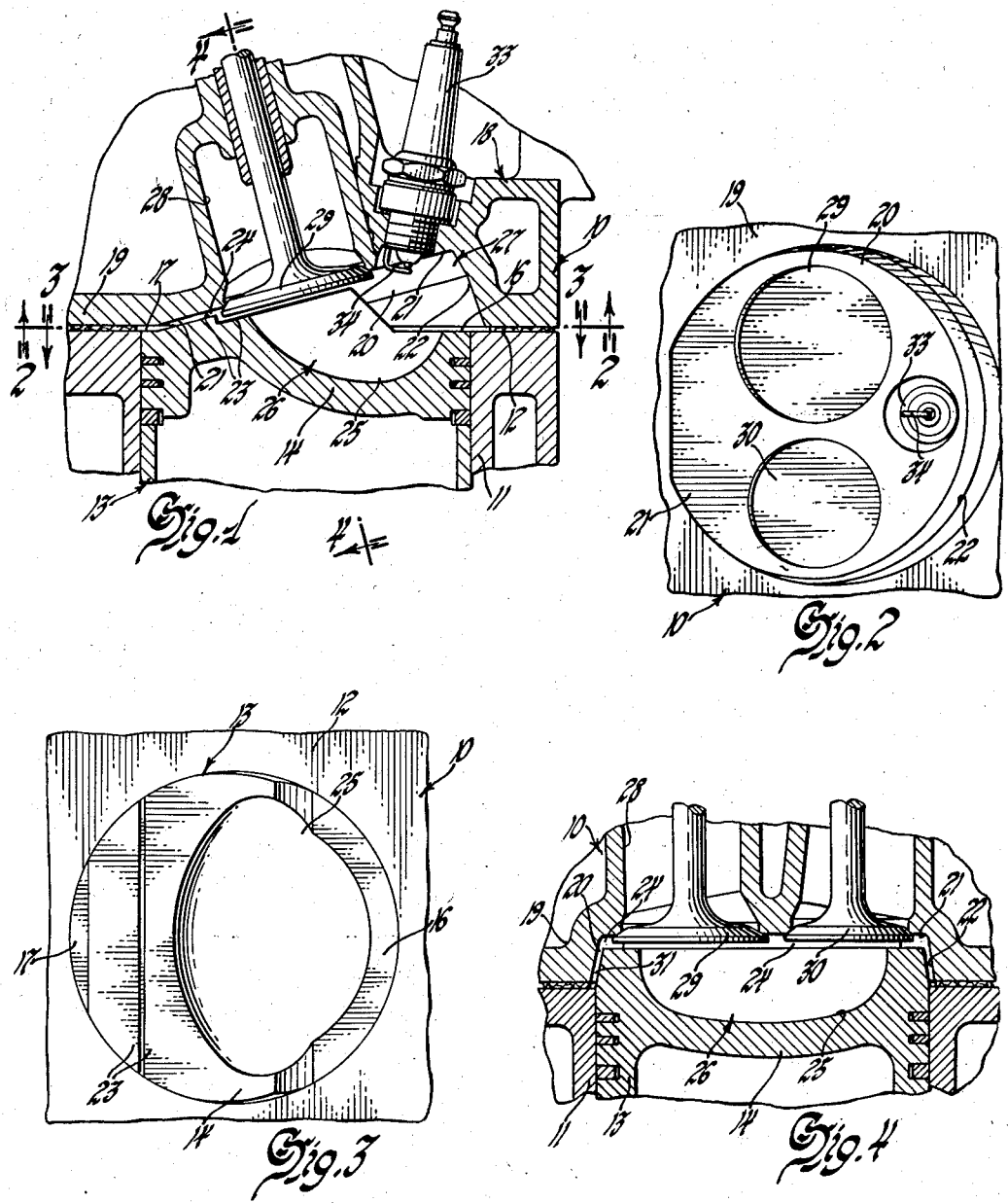

ENGINE COMBUSTION CHAMBER

Archie D. McDuffie, Berkley, Mich., assignor to General Motors Corporation, Detroit, Mich., a corporation of Delaware Application October 26, 1953, Serial No. 388,251

5 Claims. (Cl. 123—191)

This invention relates to combustion chambers for engines and particularly for valve in head, spark ignited, internal combustion engines for automotive and other uses.

It has been the practice heretofore to construct the combustion chambers in valve in head, spark ignited, internal combustion engines to provide a mechanical clearance space or a squish area on one side of the valves and the cylinder and a firing chamber containing the ignition means on the opposite side of the valves and cylinder. Engines with such combustion chambers are found to be highly satisfactory and operable with commercial grades of gasoline and other fuels and without objectionable detonation and preignition up to compression ratios in the vicinity of 8 to 8½ to 1. However, it is desirable to further increase the compression ratio in engines of this kind, without objectionable detonation and preignition and for operation on standard fuels of present quality.

It is proposed to construct a relatively more compact firing chamber than has heretofore been considered possible with engines of such construction, with the firing chamber formed partly in the head and partly in the piston of the engine, with the ignition means located more nearly in the center of mass of the compressed charge in the firing chamber when the ignition means ignite the charge, and with a minimum mechanical clearance space between adjacent surfaces of the head, the piston and the valves positioned to direct the last part of the charge to be compressed in this area directly across the surfaces of the valves and into direct contact with the spark gap terminals of the ignition means employed.

In the drawing:

Figure 1 is a fragmentary longitudinal sectional view through one of the cylinders of a valve in head, spark ignited, reciprocating piston, internal combustion engine and illustrating particularly the combustion chamber with which such an engine may be provided.

Figure 2 is a fragmentary plan view of the cylinder head employed in the engine illustrated by Figure 1, looking upwardly into the part of the combustion chamber which is formed in the head and substantially from the plane of line 2—2 on Figure 1.

Figure 3 is a plan view of the upper end of the cylinder and the piston therein, taken substantially in the plane of line 3—3 on Figure 1.

Figure 4 is a fragmentary longitudinal sectional view taken through the cylinder of the engine illustrated by Figure 1 and normally with respect to the plane of Figure 1 and substantially in the plane of line 4—4 on Figure 1.

The engine 10 which is partly shown by the several figures of the drawing comprises a cylinder 11 having an upper or outer end wall 12 disposed normally to the longitudinal axis of the cylinder 11. A piston 13 adapted to reciprocate in the cylinder 11 has an end wall 14 with oppositely disposed peripheral edge surfaces 16 and 17 formed thereon that extend substantially in the plane of the outer surface of the end wall 12, when the piston 13 is at the end of the compression stroke within the cylinder 11.

A head 18 has a lower wall 19 adapted to be secured by any suitable means to the end wall 12 of the cylinder 11. The lower wall 19 has a depression 20 formed therein in directly opposed relation to the end of the cylinder 11. The depression 20 may be formed in the wall 19 by a surface of revolution consisting of a relatively planar end surface 21 and a cylindrical side surface 22 and joining the peripheral edges of the end surface 21 substantially with the outer end of the inner surface of the cylinder 11. The end surface 21 is disposed obliquely with respect to the axis of the cylinder 11 and intersects the edge of the cylinder substantially at the end of the cylinder.

The end wall 14 of the piston 13 at one side of the cylinder 11 is formed to provide a surface 23 which is spaced from the end surface 21 of the depression 20 in such a way as to provide a minimum mechanical clearance space 24. The surfaces of the head, piston and valves forming the minimum mechanical clearance space 24 are sometimes called the squish area of the combustion chamber of an engine and may be parallel to one another and equally or variably spaced from one another in the vicinity of ten to one hundred thousandths of an inch, more or less. The wall 14 at the opposite side of the piston is formed to provide a depression 25 which with the oppositely disposed part of the depression 20 forms a firing chamber indicated at 26. The firing chamber 26 and the minimum mechanical clearance space 24 merge at the adjacent edges thereof to provide a combustion chamber 27 for the cylinder 11 of the engine 10. The head 18 is formed to provide separate inlet and exhaust passages similar to that indicated at 28 which open into both the minimum mechanical clearance space 24 and the firing chamber 26 of the combustion chamber 27. The ports by which the inlet and exhaust passages 28 communicate with the combustion chamber 27 are formed in the end surface 21 of the depression 20 at or near the diameter of the cylinder 11 and in such a way as to provide for the largest possible port area by which the inlet and exhaust passages may communicate with the cylinder 11. The inlet and exhaust passages are controlled by inlet and exhaust valves indicated at 29 and 30. In the present instance the inlet valve 29 is shown to be larger than the exhaust valve 30.

The inner surfaces of the inlet and exhaust valves 29 and 30 may be substantially in the plane of the end surface 21 of the depression 20 or they may be spaced inwardly of the cylinder 11 from the surface 21 to any desired extent. In any event the minimum mechanical clearance space 24 will be continued across the inner surfaces of the valves 29 and 30 to provide the necessary or desired clearance with the adjacent end surface 23 of the piston 13. The depression 25 and the adjacent and oppositely disposed end of the depression 20 are formed in such a way as to provide a firing chamber 26 that is as compact as possible within the compromises necessitated by the configuration of the remaining elements of the structure. Depression 25 may be defined by a surface of revolution generated with radii of curvature in vertical planes passed through piston 14, as is best illustrated in Figures 1 and 4. The portion of the depression adjacent the minimum mechanical clearance space 24 may also be defined by radii of curvature in the plane of piston end surface 23. This arrangement is best illustrated in Figure 3.

The end 14 of the piston 13 also is formed to provide oppositely disposed side surfaces indicated at 31 which are relatively uniformly spaced from the side surfaces 22 of the depression 20 to form a relatively uniform continuation of the minimum mechanical clearance space 24 throughout that part of the side surface 22 where the depression 20 does not communicate with the depression 25 to form the firing chamber 26.

In order to ignite the charge in the combustion chamber 27 when the piston 13 approaches the end of the compression stroke of the piston, the engine 10 is provided with a spark plug or other suitable ignition means indicated at 33. The spark plug has a spaced pair of ignition terminals indicated at 34 which project directly into the firing chamber 27 between the valves 29 and 30 and as near as is possible to the center of mass of the compressed charge in the firing chamber 26 and as near as possible to the adjacent edge of the minimum mechanical clearance space indicated at 24. This position generally corresponds to the origin of the radii of curvature defining depression 25 and described above. The terminals 34 also project into the firing chamber 26 in such position that the spark gap between the terminals will be substantially in the plane of the part of the minimum mechanical clearance space 24 that is between the valves 29 and 30, the end surface 21 of the depression 20 and the end surface 23 of the piston 13. In such position it will be apparent that the last part of the charge to be compressed in this part of the mechanical clearance space will be projected across the end surface of the valves and the terminals 34 for cooling and scrubbing the valves and the terminals and for carrying away from the terminals any unburned products of combustion that may have remained in the cylinder.

It will be apparent that the spark gap between the terminals 34 will not only be located about as near as it can be located to the central part of the firing chamber 26 but it will be located at the same time as near as it can be to the last part of the charge to be burned within the minimum mechanical clearance space 24. Under such circumstances the greater part of the charge contained within the firing chamber 26 will burn before detonation may occur in any part of the charge in the firing chamber and the remaining part of the charge within the minimum mechanical clearance space 24 where the surface to volume ratio is much greater will also burn in a minimum time and before detonation may occur. It will also be apparent that because of the scrubbing of the valves and the terminals of the spark plug which will result from the position of the surfaces forming the minimum mechanical clearance space with respect to the valves and the ignition terminals of the spark plug the possibility of preignition may be avoided.

The claims:

1. An engine comprising a cylinder having a reciprocal piston therein and a head at one end of said cylinder, inlet and exhaust valves operatively disposed in said head for said cylinder, a minimum mechanical clearance spaced formed at one side of said cylinder between substantially parallel and oppositely disposed wall surfaces on said valves and said head and said piston, a firing chamber formed between said head and said piston on the opposite side of said cylinder from said maximum mechanical clearance space and defined on one side by a depression in said piston having radii of curvature in a vertical plane therethrough and in the plane of said piston wall surfaces defining said mechanical clearance space and communicating with the inner edge of said mechanical clearance space, and ignition means extending into said firing chamber in a position substantially midway between the opposite extremities thereof with the terminals thereof projecting through said head substantially in the plane of said mechanical clearance space and in a position directly beyond said mechanical clearance space and substantially in the path of the blast of fluid projected into said firing chamber from said mechanical clearance space as said piston approaches said head at the end of the compression stroke of said piston.

2. An engine comprising a cylinder having a head and a reciprocal piston therein, a pair of inlet and exhaust valves opening into said cylinder through said head, a mechanical clearance space formed between the inner wall surfaces of said head and said valves and said piston, said wall surfaces forming said clearance space being disposed in closely spaced and parallel relation and having opposing parts thereof disposed obliquely with respect to the axis of said cylinder, a firing chamber also formed in said cylinder between certain of said wall surfaces and said piston and including a depression extending into said piston substantially below the upper surface thereof on the side of said cylinder opposite said mechanical clearance space and communicating with the edge of said mechanical clearance space, and ignition means projecting into said firing chamber intermediate the opposite extremities thereof and beyond and substantially in the plane of said clearance space and in such position that the terminals of said ignition means will be substantially within the blast of fluid discharged from said mechanical clearance space into said firing chamber as said piston approaches the end of its travel upon the compression stroke of the engine.

3. An engine comprising a cylinder having a normally disposed end surface, a piston operable in said cylinder and having normally disposed and spaced end surfaces on opposite sides thereof and disposed substantially in the plane of said end surfaces of said cylinder when said piston is at outer dead center position in said cylinder, a head adapted to be secured upon said end surface of said cylinder and having a depression therein in opposed relation to said cylinder, said depression being formed to provide an inner surface about an axis disposed obliquely to the axis of said cylinder and in opposed relation to said cylinder and including a plane inner end surface intersecting said end surface of said cylinder at one side of said cylinder and an arcuate inner side surface forming substantially a continuation of the inner surface of said cylinder, said piston between said spaced end surfaces being formed to provide an intermediate end surface disposed in closely spaced relation to said plane inner end surface of said head on one side of said cylinder and to provide a depression extending into said piston and beyond said normally disposed end surfaces of said cylinder and said head, a pair of inlet and exhaust valves extending through said inner end surface of said head and in parallel relation to said spaced end surfaces of said piston and into the mechanical clearance space between said surfaces of said head and said piston and in opposed relation to said depression in said piston, and a spark plug having the ignition terminals thereof extending directly into said firing chamber.

4. An engine comprising a cylinder having a normally disposed end surface, a piston operable in said cylinder and having an end projecting beyond said end surface when said piston is at outer dead center position in said cylinder, a head adapted to be secured upon said end surface of said cylinder and having a depression therein in opposed relation to said cylinder, said depression being formed to provide an inner surface about an axis disposed obliquely to the axis of said cylinder and in opposed relation to said cylinder and including a plane inner end surface intersecting said end surface of said cylinder at one side of said cylinder and an arcuate inner side surface forming substantially a continuation of the inner surface of said cylinder, said piston end between the opposite sides of said cylinder being formed to provide oppositely and obliquely disposed plane outer end surfaces with one of said plane outer end surfaces being disposed in closely spaced relation to said plane inner end surface of said head on one side of said cylinder and with said plane inner end surface of said head forming a minimum mechanical clearance space for said cylinder and with the other of said obliquely disposed plane outer end surfaces and the adjacent surface of said end of said piston and said depression in said head on the opposite side of said cylinder forming a firing chamber for said cylinder communicating with the inner edge of said minimum mechanical clearance space, a pair of inlet and exhaust valves disposed in said head and directly opening into said minimum mechanical clearance space and said firing chamber through said plane inner end surface of said head and being disposed in substantially parallel relation to the opposite sides of said cylinder, and a spark plug disposed in said head and projecting into said firing chamber between said valves.

5. An engine as defined by claim 4 and in which said adjacent surface of said end of said piston forms a depression in said piston extending into the end thereof beyond said normally disposed end surface of said cylinder.

References Cited in the file of this patent

UNITED STATES PATENTS

| | | |
|---|---|---|
| 1,636,214 | Cappa | July 19, 1927 |
| 2,016,734 | Wittenberg et al. | Oct. 8, 1935 |
| 2,022,556 | Brown | Nov. 26, 1935 |
| 2,214,941 | Taub | Sept. 17, 1940 |
| 2,265,677 | Straub | Dec. 9, 1941 |
| 2,282,435 | Swaine | May 12, 1942 |
| 2,428,866 | MacPherson | Oct. 14, 1947 |
| 2,580,951 | Pescara | Jan. 1, 1952 |

FOREIGN PATENTS

| | | |
|---|---|---|
| 348,938 | Great Britain | May 21, 1931 |
| 571,715 | Great Britain | Sept. 5, 1945 |
| 684,873 | Great Britain | Dec. 24, 1952 |

OTHER REFERENCES

Austro-Motor Magazine (German), February 1954, vol. IX, No. 2, p. 56.